United States Patent [19]
Tsutsumi et al.

[11] Patent Number: 5,307,549
[45] Date of Patent: May 3, 1994

[54] APPARATUS AND METHOD FOR SYNCHRONIZED CONTROL OF MACHINE TOOLS

[75] Inventors: Seisuke Tsutsumi; Nobuyuki Ito, both of Aichi, Japan

[73] Assignee: Mitsubishi Denki Kabushiki Kaisha, Tokyo, Japan

[21] Appl. No.: 929,124

[22] Filed: Aug. 13, 1992

[30] Foreign Application Priority Data

Aug. 16, 1991 [JP] Japan ................. 3-205992

[51] Int. Cl.$^5$ ................. B23B 47/00; B23G 3/00; G05B 19/24
[52] U.S. Cl. ................. 29/27 C; 318/571; 364/474.02; 364/474.32; 408/10; 470/96
[58] Field of Search ............... 29/27 R, 27 C; 408/9, 408/10, 14, 13; 409/76; 364/474.02, 474.12, 474.30, 474.32, 474.11, 474.33; 318/571; 470/96

[56] References Cited

U.S. PATENT DOCUMENTS

| | | | |
|---|---|---|---|
| 4,353,018 | 10/1982 | Kohzai et al. | 318/571 |
| 4,656,405 | 4/1987 | Kiya et al. | 364/474.32 X |
| 4,722,123 | 2/1988 | Pruvot et al. | 29/27 C |
| 4,808,047 | 2/1989 | Calevich et al. | 408/14 |
| 4,879,660 | 11/1989 | Asakura et al. | 364/474.15 |
| 4,941,104 | 7/1990 | Teshima et al. | 364/474.3 |
| 4,985,841 | 1/1991 | Iwagaya | 364/474.33 |
| 5,010,286 | 4/1991 | Nakamura | 318/571 |
| 5,091,860 | 2/1992 | Fujimoto | 364/474.11 |
| 5,093,972 | 3/1992 | Kaku et al. | 29/27 C |
| 5,117,368 | 5/1992 | Yamaguchi et al. | 364/474.32 |

FOREIGN PATENT DOCUMENTS

2-237743  9/1990  Japan.

Primary Examiner—William Briggs
Attorney, Agent, or Firm—Sughrue, Mion, Zinn, Macpeak & Seas

[57] ABSTRACT

A machine tool for performing drilling operations at a high speed on a rotating workpiece and for subsequently performing threading operations while minimizing loss time due to speed changes, based upon synchronization of the workpiece with tools that separately perform the drilling and threading operations. During the performance of the drilling operation, a high speed rotation of the workpiece is maintained and workpiece position is detected. The tapping tool is rotated to a similar high speed and is synchronized with the rotating workpiece in both rotational velocity and position. Upon completion of the drilling operation, tapping is performed and subsequent drilling operations may be resumed promptly. Since synchronization has been achieved, the switching between drilling and tapping operations may be obtained with little loss time.

7 Claims, 8 Drawing Sheets

APPARATUS AND METHOD FOR SYNCHRONIZED CONTROL OF MACHINE TOOLS

BACKGROUND OF THE INVENTION

1. Field of the Invention

The present invention relates to an apparatus and method for controlling a multi-functional machine tool which performs threading and machining operations other than threading, such as cutting.

2. Description of the Background Art

Figure 4:
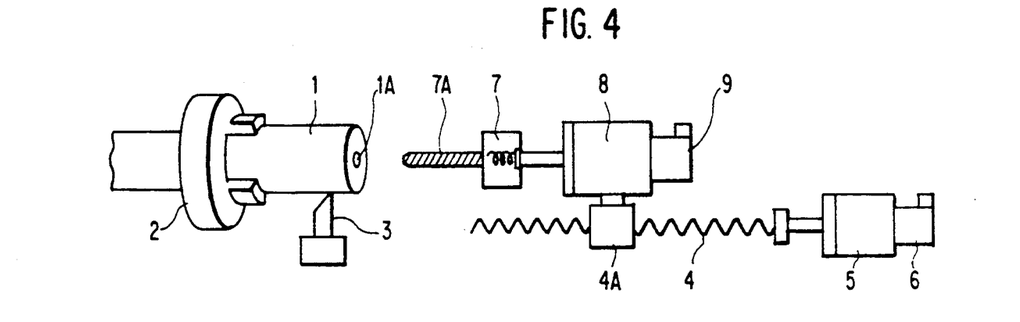
FIG. 4 gives the overview of a machine tool that allows cutting and threading operations to be performed which are common to the background art and the embodiments of the present invention.

FIG. 4 shows the primary parts of a machine tool with a threading function, serving as a multi-functional machine tool for carrying out threading and other machining operations than threading, e.g., cutting. Referring to FIG. 4, a workpiece 1, having a pre-drilled hole 1A for threading, is held by a spindle 2 and is rotated. A cutting tool 3 is used for cutting the workpiece 1 as it is held and rotated by the spindle 2. The numeral 4 indicates a ballscrew, and 5 a threading tool moving motor for rotating the ballscrew 4 in a forward or reverse direction. A threading tool 7, described later, may be advanced or retracted via a screwed portion 4A of the ballscrew 4 and a threading tool driving motor 8, described later. An encoder 6 is directly coupled with the threading tool moving motor 5 for detecting the rotation value (angle) of the threading tool moving motor 5. The threading tool 7 includes a tap 7A, and the threading tool drive motor 8 rotates the tap 7A. An encoder 9 is directly coupled with the driving motor 8 for detecting the rotation value of the drive motor 8.

Fitted within the threading tool 7 at its end, and adjacent the threading tap 7A, to provide a floating tap type, is a spring that is reciprocatively movable back and forth in an axial direction. Driven by the moving motor 5, the threading tool 7 advances toward the workpiece 1. When the end of the tap 7A makes contact with the pre-drilled hole 1A in the workpiece 1, the tap 7A is rotated by the drive motor 8 and the threading tool 7 then advances into the pre-drilled hole 1A of the workpiece 1 automatically, thus threading the workpiece 1. The tap 7A retracts when the drive motor 8 is rotated in an opposite direction.

Figure 5:
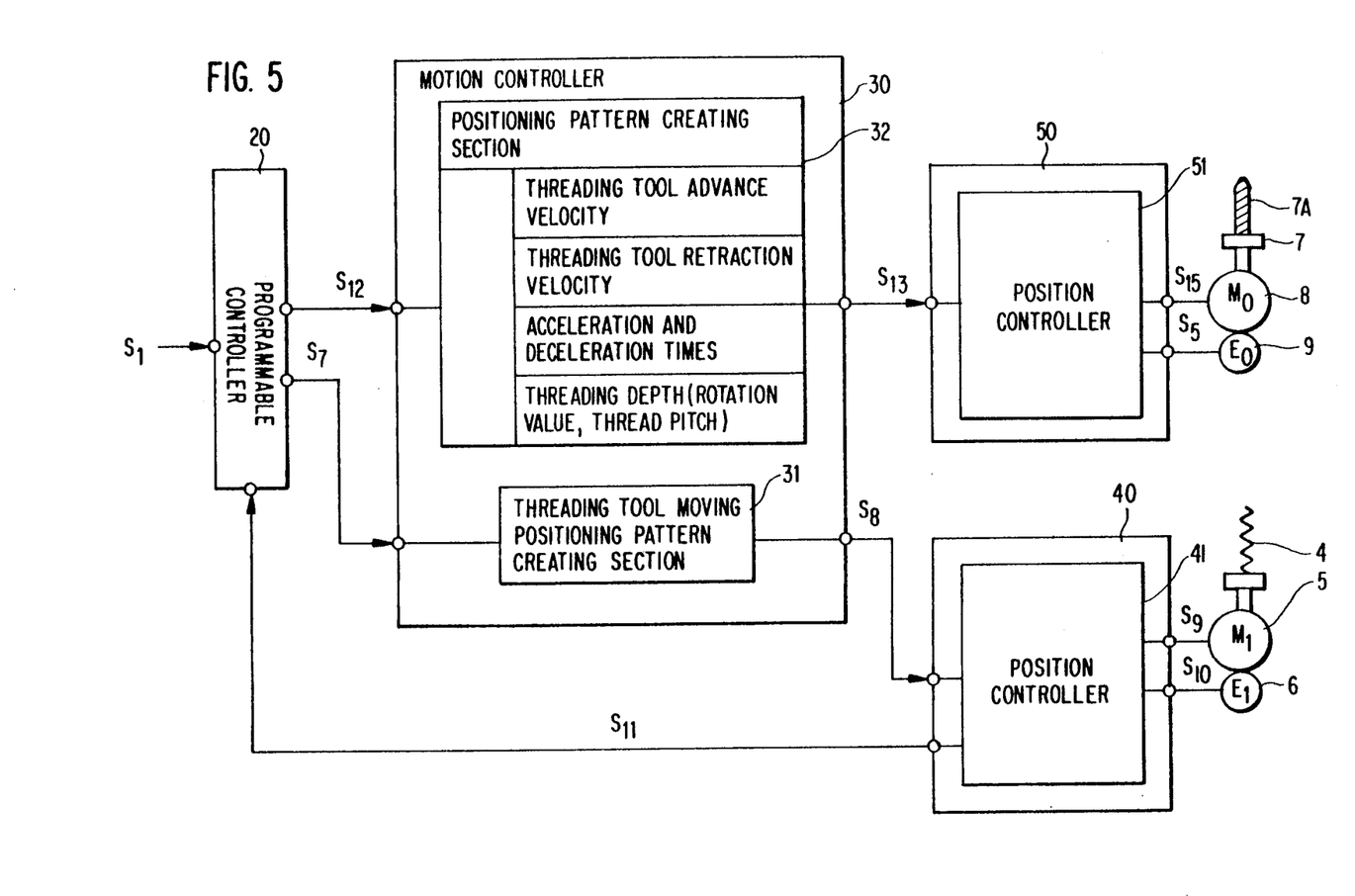
FIG. 5 is a block diagram illustrating the arrangement of a machine tool control apparatus and method known in the art.

FIG. 5 is a block diagram that illustrates sections for controlling the threading tool 4 in a machine tool control apparatus known in the art for drive-controlling the machine tool shown in FIG. 4. Referring to FIG. 5, a programmable controller 20 is used for sequence-controlling the machine tool through the execution of a sequence program. The controller 20 will output a threading tool motion start command S7 for advancing the threading tool 7 when it receives a threading process start command S1. Then, the controller will output a threading start command S12 for initiating threading by means of the threading tool 7 when receiving a threading tool motion completion signal S11.

A motion controller 30 is operative to create and output the operation pattern of the threading tool 7. The controller 30 comprises a threading tool moving positioning pattern creating section 31 for creating a positioning pattern that starts the threading tool 7 and positions the end of the tap 7A with respect to the workpiece 1 on receipt of the threading tool motion start command S7 from the programmable controller 20. Section 31 outputs the threading tool moving positioning pattern together with a tool positioning command S8. The controller 30 also contains a positioning pattern creating section 32 for creating a positioning pattern of the tap 7A and specifying the depth of threading into the workpiece 1 by the threading tool 7. The controller 30 is operative to engage sections 31 and 32 on receipt of the threading start command S12 and to output the positioning pattern together with a positioning command S13.

A drive controller 40 is operative for drive-controlling the threading tool moving motor 5 and is equipped with a position controller 41 for carrying out position control during the threading movement. For example, it controls the advance and retraction of the threading tool 7 by driving the threading tool moving motor 5 on receipt of the positioning command S8 and will exercise a negative feedback control of the motor 5 on receipt of a signal S10 from the encoder 6. When the movement of the threading tool 7 is complete, the drive controller 40 outputs the tool movement completion signal S11 to the programmable controller 20. A drive controller 50 is designed for drive-controlling the threading tool drive motor 8 and is equipped with a position controller 51 for rotating the threading tool 7 in a forward and reverse directions and controlling the advance position, etc., of the tap 7A. Controller 50 also amplifies the positioning signal S13 entered, provides an output S15 to the threading tool drive motor 8, and drives the motor 8 on receipt of the positioning signal S13. Controller 50 also carries out the negative feedback control of motor 8 on receipt of a signal S5 output from the encoder 9, thereby threading the workpiece 1 along a predetermined depth.

Figure 6:
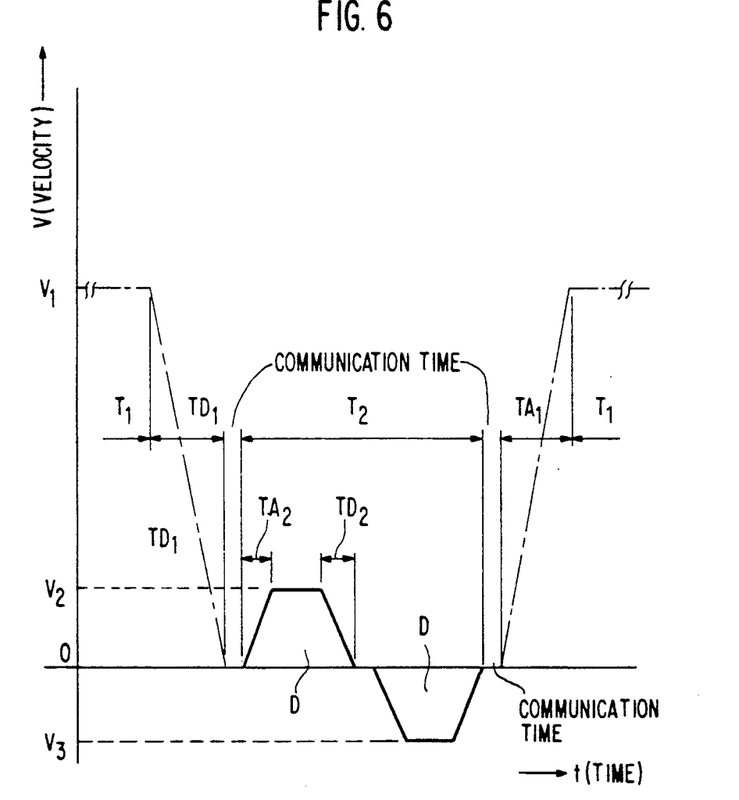
FIG. 6 illustrates operation performed for thread cutting by the machine tool control apparatus shown in FIG. 5.

FIG. 6 illustrates changes with time in the forward and reverse rotational velocities of the threading tool 7 driven by the drive motor 8 (the advance and retraction velocities of the tap 7A) and the rotational velocity of the spindle 2. The advance and retraction velocities of the tap 7A are proportional to the rotational velocities of the threading tool 7 of the floating type which advanceably and retractably rotates the tap 7A.

Figures 7A, 7B:
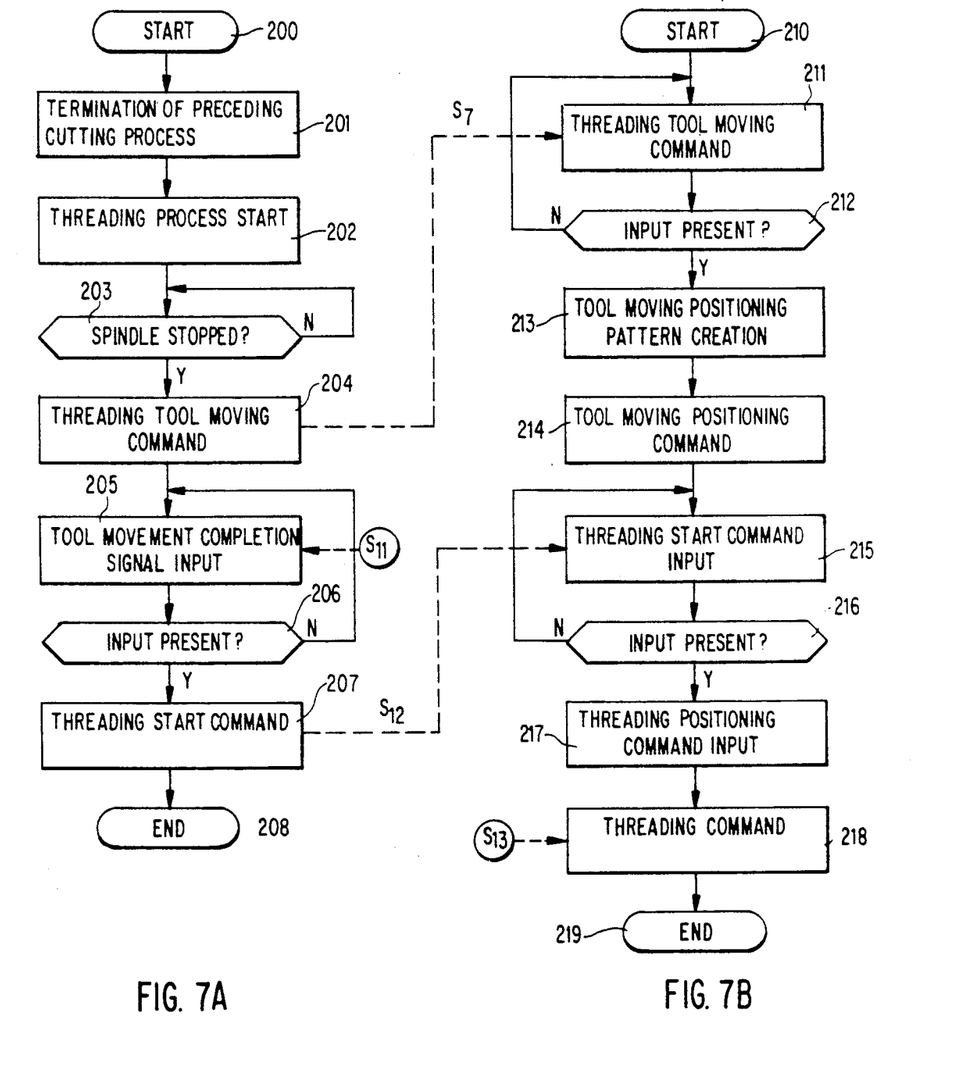
FIG. 7A-7D are a flowchart indicating the operation sequences of the machine tool control apparatus shown in FIG. 5.
Figure 7C:
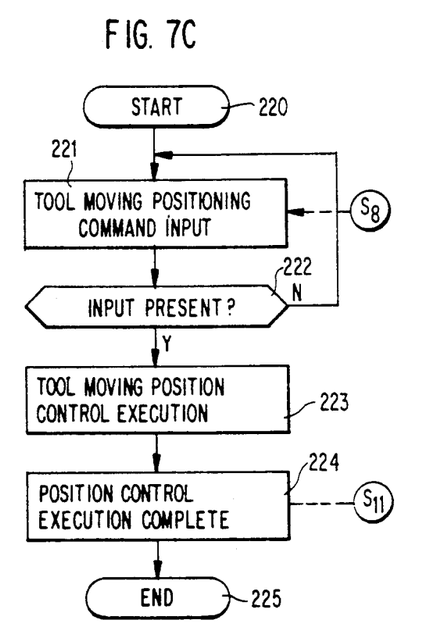
Figure 7D:
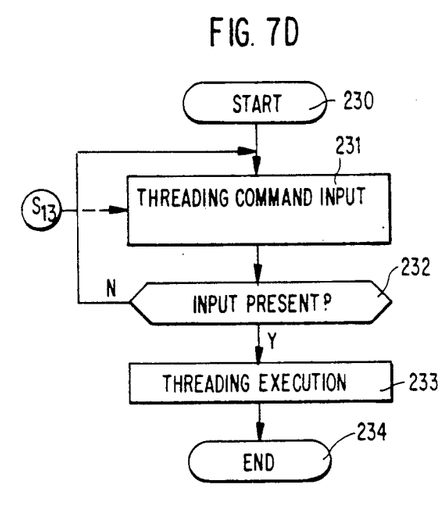

FIG. 7 is a flowchart indicating the four operation sequences of the machine tool control apparatus shown in FIG. 5, wherein the sequence A gives the operation of the programmable controller 20, the sequence B that of the motion controller 30, and the sequences C and D give those of the drive controllers 40 and 50, respectively.

The operation of the machine tool control apparatus will now be described in further detail. In the sequence A shown in FIG. 7, the programmable controller 20 is started up in step 200. The cutting of the workpiece 1 held by the spindle 2, for example, is finished in step 201. Then, the threading process start signal S1 is entered in step 202, and whether the spindle 2 has stopped rotating or not is checked in step 203. When it has been confirmed that the spindle 2 has stopped rotating, the threading tool movement start command S7 is output to the motion controller 30 in step 204. When the threading tool movement start command S7 is input in step 211 of the sequence B, the motion controller 30 checks whether this command has been entered or not in step 212. If it is confirmed that the command has been entered, the motion controller 30 creates a tool moving positioning pattern in the threading tool moving positioning pattern creating section 31 in step 213, and outputs to the position controller 41 of the drive controller 40 in step 214 the tool moving positioning pattern information together with the positioning command S8 for tool movement.

The tool moving positioning signal S8 is input into step 221 of the sequence C. As a result, the position controller 41 in the drive controller 40 checks whether this signal has been entered in step 222. If it has been checked that the signal has been entered, the position controller 41 executes position control in the movement of the threading tool 7 in step 223, i.e., advances the threading tool 7 toward the workpiece 1 according to the tool moving positioning pattern and brings the tap 7A into contact with the pre-drilled hole 1A in the workpiece 1. When the position control of the threading tool 7 is complete, the position controller 41 outputs the threading tool movement completion signal S11 to the programmable controller 20 in step 224, and sequence C ends at step 225.

The signal S11 is input in step 205 of the sequence A. As a result, the programmable controller 20 checks whether this signal S11 has been entered or not in step 206. If it is confirmed that the signal has been entered, then the programmable controller 20 outputs the threading start command S12 to the positioning pattern creating section 32 of the motion controller 30 in step 207. The sequence A ends at step 208.

When the threading start command S12 is input in step 215 of the sequence B, the positioning pattern creation section 32 of the motion controller 30 checks whether the command S12 has been entered or not in step 216. If it is confirmed that the command has been entered, the positioning pattern creating section 32 creates the positioning pattern of the threading tool 7 in step 217 in accordance with pre-entered parameters such as threading tool advance velocity, threading tool retraction velocity, acceleration and deceleration times, and threading depth (rotation value, thread pitch). In addition, section 32 outputs to the position controller 51 of the drive controller 50 the positioning pattern information together with the threading tool positioning command S13 in step 218. When the positioning pattern information and positioning command S13 are input in step 231, the position controller 51 of the drive controller 50 checks whether the information and command have been entered or not in step 232 of FIG. 7 sequence D. If it is confirmed that they have been entered, the position controller 51 controls the threading of the workpiece 1 to the predetermined depth and pitch in accordance with the positioning pattern information in step 233, and the sequence D ends at step 234.

The positioning pattern information comprises information on the changes of the threading tool 7 rotational velocities with time during a period of threading time T2 in FIG. 6. This is indicated by threading tool 7 rotational velocities V2 and V3 in a vertical axis and by threading tool 7 acceleration time TA2, deceleration time TD2, etc., in a horizontal axis. Namely, since the tap 7A provided in the threading tool 7 forms a floating structure wherein it is rotated by the threading tool 7 and reciprocatively movable in an axial direction, the forward rotation of the threading tool 7 at the rotational velocity V2 with the tap 7A in contact with the pre-drilled hole 1A of the workpiece 1 causes the tap 7A to be rotated and to advance, cutting threads in the pre-drilled hole 1A of the workpiece 1. This advance velocity of the tap 7A is directly proportional to its rotational velocity employing the thread pitch as a constant. Accordingly, area D obtained from time t and threading tool 7 rotational velocity V2 or V3 in FIG. 6 indicates the threading depth in the workpiece 1.

When the positioning pattern information created by the positioning pattern creating section 32 of the motion controller 30 in accordance with the pre-entered parameters required for threading, e.g., threading tool 7 advance and retraction velocities, acceleration and deceleration times, and threading depth, is entered into the drive controller 50, a deviation signal between the positioning pattern information and the output signal of the encoder 9 is amplified by the position controller 51 in the drive controller 50. Also, the motor 8 is controlled according to the output S15 of the position controller 51, the threading tool 7 is driven via the motor 8, and the workpiece 1 is threaded to the predetermined depth by the tap 7A.

In the machine tool having a threading function as shown in FIG. 4, for example, the workpiece 1 is cut in the cutting process at a high spindle 2 rotational velocity (for example, 10,000 rpm), as indicated by the rotational velocity V1 in FIG. 6. In preparation for a subsequent threading process, the spindle 2 is brought to a stop during deceleration period TD1. This is followed by a brief communication period during which a process of FIG. 7, beginning at step 203, is conducted. When the threading operation begins at step 215 and while it continues for period T2, the threading tool 7 is advanced to bring the tap 7A into contact with the pre-drilled hole 1A of the workpiece 1, and the workpiece 1 is threaded at a low rotational velocity (for example, 100 to 200 rpm), as indicated by V2 (advance) in FIG. 6. Being of the floating type, the threading tool 7 advances automatically while rotating (in the forward direction). That is, in the threading operation, the spindle 2 reaches the constant rotational velocity V2 in the acceleration time TA2, is maintained at velocity V2 and then is brought to a stop in the deceleration time TD2. After a brief pause, the retract operation, which follows an acceleration to velocity V3 and then deceleration to zero, is conducted. Finally, following a second, communication period, the spindle speed is raised from zero to V1 during period TA1.

In the conventional design, it is necessary for the machine tool to stop the workpiece 1, which is rotating at high speed for the machining operation, before performing the threading operation. When the cutting and threading processes are scheduled alternately, the spindle must repeat fast rotation and stop. As a result, "tact time" is increased by a substantial "loss time". In the preferred embodiment, the loss time is equivalent to a sum of the spindle deceleration time TD1 and spindle acceleration time TA1.

When the cutting and threading of the workpiece held by the spindle are repeated alternately in the conventional machine tool control apparatus constructed as described above, the spindle rotating at high speed must be brought to a stop before carrying out threading, and after the threading is finished, the spindle must be rotated at high speed again, resulting in relatively long "tact time".

SUMMARY OF THE INVENTION

It is accordingly an object of the present invention to overcome the disadvantages in the background art by providing a machine tool controlling apparatus and method which relatively reduces tact time when a machining operation other than threading and the threading operation are repeated alternately.

The present invention achieves a machine tool control apparatus and method that relatively reduce the tact time of machining processes including thread cutting. A first feature of invention provides a threading control means which synchronizes the rotational velocity and rotational position of threading means in a machine tool with those of a spindle and overlaps a positioning pattern with the spindle rotational velocity to control the threading means in said machine tool, thereby threading a workpiece.

A second feature of the invention includes the steps of synchronizing the rotational velocity and rotational position of threading means in a machine tool with those of a spindle and overlapping a positioning pattern with the spindle rotational velocity, thereby threading a workpiece.

DESCRIPTION OF THE PREFERRED EMBODIMENTS

An embodiment of the invention will now be described with reference to FIG. 1 to FIG. 3, wherein reference characters that are identical to those of the background art designate identical or corresponding parts. It should be noted that the general structure of a machine tool to which the invention applies is identical to the one in FIG. 4 explained in the background art and will not be described here.

Figure 1:
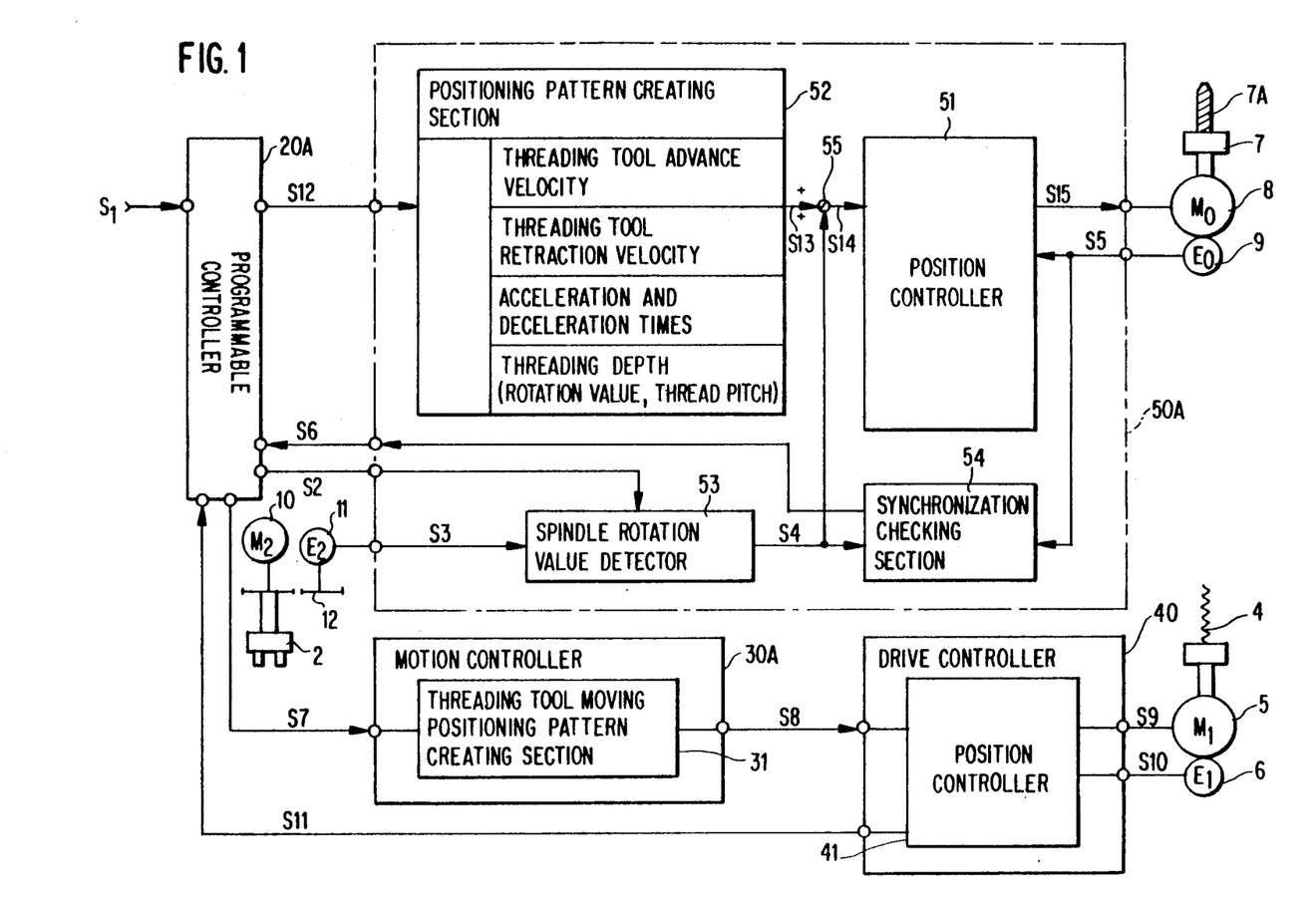
FIG. 1 is a block diagram illustrating the arrangement of a machine tool control apparatus in accordance with first and second embodiments of the invention.

FIG. 1 is a block diagram of a control apparatus for a multi-functional machine tool, wherein the numeral 10 indicates a motor for rotating a spindle 2, 11 an encoder acting as spindle rotation detector for detecting the rotation value (rotational angle) of the spindle 2 and being mounted to the spindle 2 via gears 12, and 20A a programmable controller for sequence-controlling the machine tool through the execution of a sequence program. The programmable controller 20A has substantially the same hardware as the programmable controller 20 included in the background art shown in FIG. 5. However, it is different therefrom in that, on receipt of a threading process start command S1 during execution of the sequence program, a synchronization start command S2 which synchronizes the rotational velocity of a threading tool 7 with that of the spindle 2 is output together with a threading tool movement start command S7 which advances the threading tool 7. The other difference is that a threading start command S12 is output on receipt of both a rotational velocity synchronization completion signal S6 for the spindle 2 and threading tool 7 and a threading tool movement completion signal S11 from a position controller 41 of a drive controller 40 for drive-controlling a threading tool moving motor 5.

A motion controller 30A is equipped with a tool moving positioning pattern creating section 31, identical to the one shown in FIG. 5. However, the positioning pattern creating section 32 is not included in the motion controller 30A, making it different from the conventional motion controller 30.

A drive controller 50A is used for drive-controlling the drive motor 8 for threading tool 7. A positioning pattern creating section 52 provided therein is identical to the positioning pattern creating section 32 in the background art shown in FIG. 5. A spindle rotation value detecting section 53 is used for detecting the rotation value and velocity of the spindle 2. In this regard, section 53 continuously receives an output signal S3 of the encoder 11 which represents the detected rotational angle of the spindle 2. This value is important to identifying the position on the circumference of the machined hole in the rotating workpiece 1 where threading is to begin, so that all pieces are identical. When the synchronization start command S2 is input from the programmable controller 20A, the spindle rotation value detecting section 53 outputs the rotation value, i.e., information S4 such as rotational velocity and rotational position, of the spindle 2. A synchronization checking section 54 is used for checking the synchronization state of the spindle 2 and threading tool 7 rotations. Section 54 receives and compares the rotational velocity information S4 of the spindle 2 and the rotational velocity information S5 of the threading tool 7 output by an encoder 9. When section 54 confirms synchronization on the basis of an information match, the synchronization checking section 54 outputs a synchronization completion signal S6 to the programmable controller 20A An adder 55 is for adding the rotational velocity information S4 of the spindle 2 output by the rotation value detecting section 53 and the positioning pattern information S13 of the threading tool 7 output by the positioning pattern creating section 52 and outputting an addition signal S14 to the position controller 51. The threading tool 7 driving motor 8 is driven according to an output S15 of the position controller 51. Also, its rotation value is detected by the encoder 9, and a detection signal S5 of the encoder 9 is input to the position controller 51 for the negative feedback control of the drive motor 8. As discussed above, threading control is provided by at least the position controllers 41 and 51, spindle rotation value detecting section 53, synchronization checking section 54, and adder 55.

Figure 2:
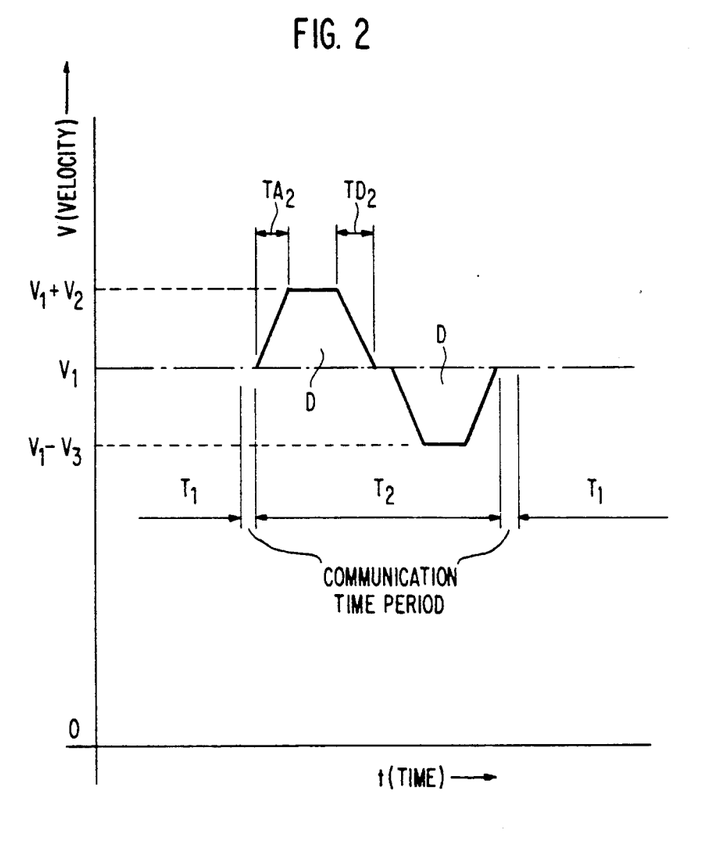
FIG. 2 illustrates operation performed for thread cutting by the machine tool control apparatus shown in FIG. 1.

FIG. 2 illustrates changes with time in the forward and reverse rotational velocities of the threading tool 7. Specifically shown are advance and retraction velocities, when the workpiece 1 is threaded by the threading tool 7 as it is controlled in synchronization with the spindle 2 rotation by the control apparatus shown in FIG. 1.

FIG. 3 comprises a flowchart indicating four interrelated operation sequences of the machine tool control apparatus shown in FIG. 1. The sequence A provides the operation of the programmable controller 20A, the sequence B shows that of the motion controller 30A, and the sequences C and D show those of the drive controllers 40 and 50A, respectively. The relationships among the sequences are represented by dotted lines.

The operation of the present embodiment will now be summarized. When the synchronization start signal S1 is entered into the programmable controller 20A from the outside, the spindle rotation value detecting section 53 receives outputs from the encoder 11 mounted on the spindle 2 and detects the rotation value of the spindle 2. Section 53 then outputs a command S4 to drive-control the threading tool driving motor 8 by means of the position controller 51. This will synchronize the rotation of the threading tool driving motor 8 with that of the spindle 2.

Pre-entered parameters, such as the threading tool 7 advance velocity and retraction velocity, acceleration and deceleration times and threading depth required for thread cutting, are stored in the positioning pattern creating section 52 of the drive controller 50A. The pre-entered parameters represent a particular positioning pattern. When the parameters are stored, the section 52 outputs the position command S13. The position command S13 and the position command S4 output by the spindle rotation value detecting section 53 are added and the result is given to the position controller 51 as a position command, thereby controlling the position of the threading tool driving motor 8.

The operation of the present embodiment will now be described in more detail with reference to FIG. 1 to FIG. 4. In the sequence A of FIG. 3, the programmable controller 20A initiates the execution of a sequence program in step 100, and a cutting process prior to thread cutting is completed in step 101. When the threading process start command S1 is input in step 102, the threading tool movement start command S7 is output to the motion controller 30A and simultaneously the synchronization start command S2 is also output to the drive controller 50A in step 103. The threading tool movement positioning pattern creating section 31 of the motion controller 30A receives the threading tool movement command S7 from the programmable controller 20A in step 111 of the sequence B and checks whether this command has entered or not in step 112. If it is confirmed that the command has been entered, the positioning pattern creating section 31 creates a tool moving positioning pattern in step 113. The pattern causes the threading tool 7 to advance to a predetermined position where the tap 7A makes contact with the pre-drilled hole 1A of the workpiece 1 and to then retract to the original position after thread cutting. The section 31 outputs to the position controller 41 in the drive controller 40 the tool moving positioning pattern information together with the tool positioning command S8 in step 114.

Figure 3A:
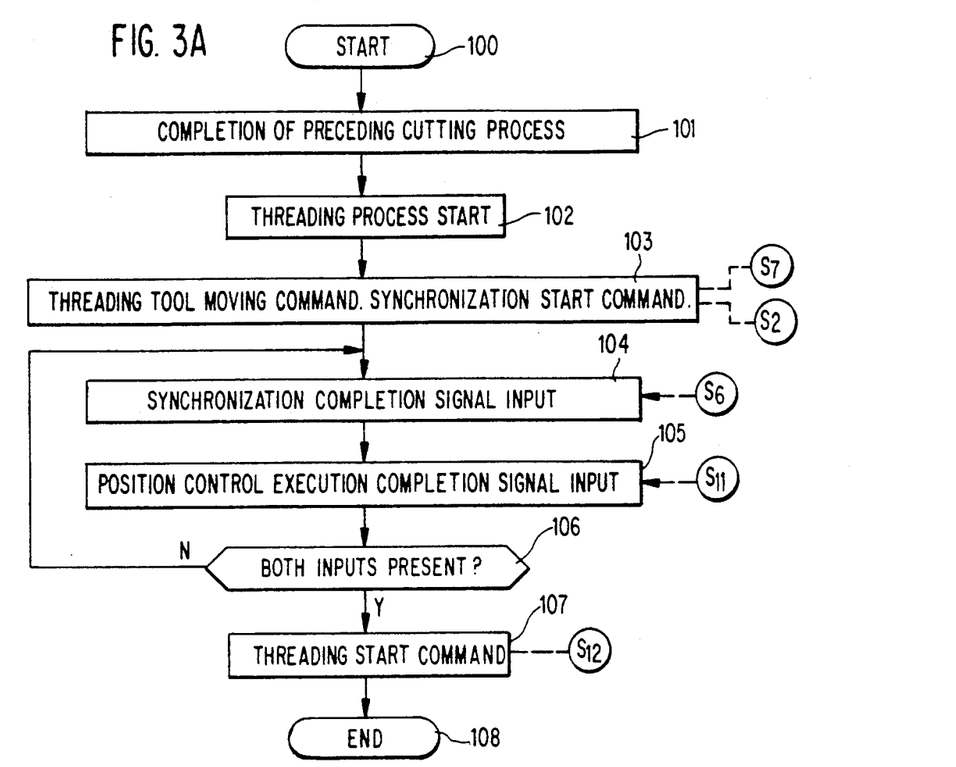
FIG. 3A-3D are a flowchart indicating the operation sequences of the machine tool control apparatus shown in FIG. 1.
Figure 3B:
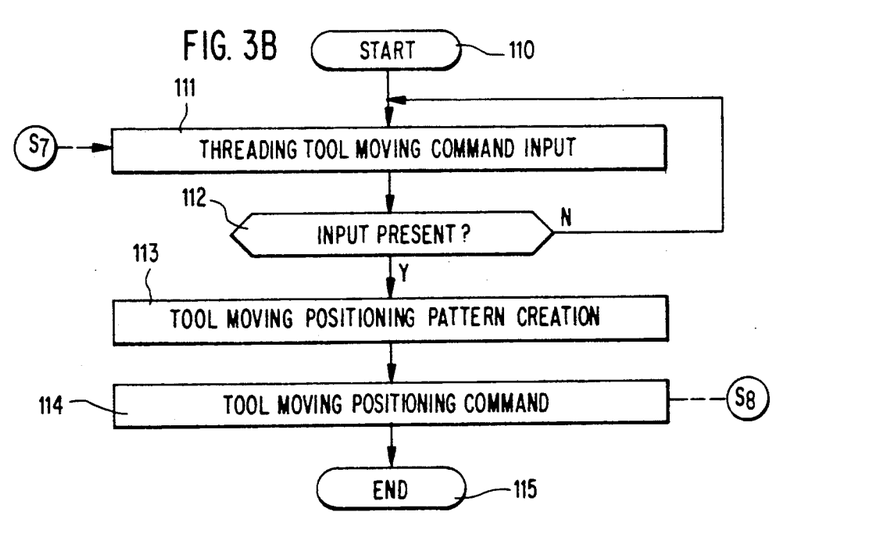
Figure 3C:
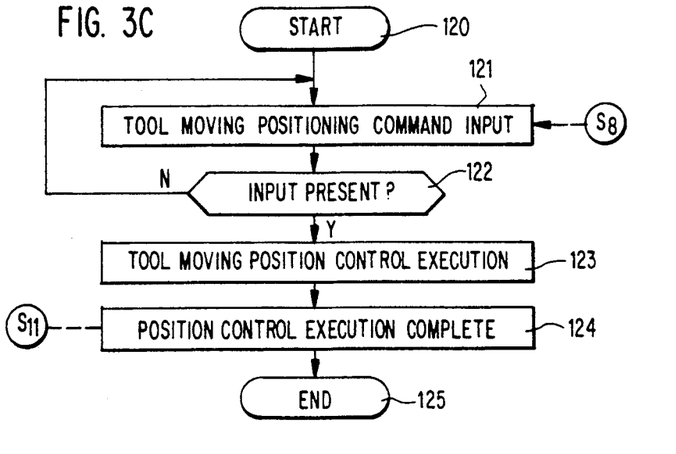

When the tool moving positioning command S8 and tool moving positioning pattern information are input from the threading tool moving positioning pattern creating section 31 of the motion controller 30A in step 121 of the sequence C, the position controller 41 in the drive controller 40 checks whether the command and information have been entered or not in step 122. If it is confirmed that the command and information have been entered, the position controller 41 drive-controls the moving motor 5 to execute tool moving position control in step 123, i.e., advances the threading tool 7 toward the workpiece 1 according to the tool moving positioning pattern and brings the tap 7A into contact with the pre-drilled hole 1A in the workpiece 1. When the positioning control of the threading tool 7 is complete, the position controller 41 outputs the threading tool movement completion signal S11 to the programmable controller 20A in step 124, and sequence C ends at step 125.

Figure 3D:
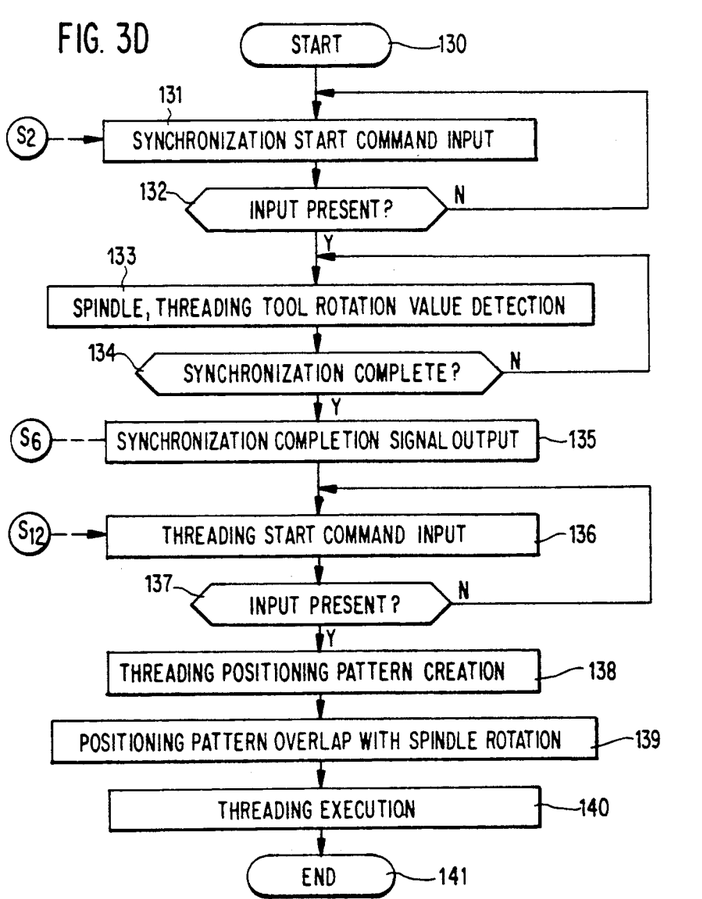

In the meantime, when the synchronization start command S2 is input from the programmable controller 20A in step 131 of the sequence D, the spindle rotation value detecting section 53 of the drive controller 50A checks whether this command has been entered or not in step 132. When its input has been confirmed, the spindle rotation value detecting section 53 starts detecting the rotation value, i.e., rotational velocity and rotational position, of the spindle 2 on receipt of the output signal S3 of the encoder 11, which detects the rotation of the spindle 2 via the gears 12. Section 53 then outputs the spindle rotational velocity information S8, i.e., rotation value of the spindle 2, to the position controller 51 and synchronization checking section 54.

Upon receiving the spindle rotation value information S4 from the spindle rotation value detecting section 53 via the adder 55, the position controller 51 drives the drive motor 8 according to its output S15, rotating the threading tool 7. The position controller 51 also receives the output signal S5 of the encoder 9 directly coupled with the drive motor 8. Accordingly, the position controller 51 negative-feedback-controls the drive motor 8, thereby matching the rotational velocity of the threading tool 7 with that of the spindle 2 in an ordinary state. The synchronization checking section 54 receives, detects and compares the spindle rotational velocity information S4 and the rotational velocity information S5 of the threading tool 7 coming from the encoder 9. On checking that the rotational velocity and rotational position of the spindle 2 match those of the threading tool 7, i.e., synchronization is complete, in step 134, the checking section 54 outputs the synchronization completion signal S6 in step 135.

When the synchronization completion signal S6 is input in step 104 and the threading tool moving position control execution completion signal S11 is also input in step 105, the programmable controller 20A checks whether both signals S6 and S11 have been entered or not in step 106. If it is confirmed that both signals have been entered, then the programmable controller 20A outputs the threading start command S12 to the positioning pattern creating section 52 of the drive controller 50A in step 107, and the sequence A ends at step 108.

When the threading start command S12 is input in step 136 of the sequence D, the positioning pattern creating section 52 of the drive controller 50A checks whether the command S12 has been entered or not in step 137. If it is confirmed the command has been entered, the positioning pattern creating section 52 creates the positioning pattern of the tap 7A in the threading tool 7 in step 138 in accordance with the pre-entered parameters such as the threading tool advance and retraction velocities, acceleration and deceleration times, and threading depth (rotation value, thread pitch). Section 52 then outputs the positioning pattern information together with the threading tool positioning command S13. As indicated by T2 in FIG. 2, the positioning pattern information is overlapped with the rotational velocity S4 of the spindle 2 by adding them by means of the adder 55 in step 139, and the result is input to the position controller 51 as the addition signal S14. In step 140, the position controller 51 amplifies the incoming addition signal S14, provides it to the drive motor 8 as the output S15, and also receives the detection signal S5 of the encoder 9 which detects the rotation value of the drive motor 8, thereby carrying out the negative feedback control of the drive motor 8. As a result, the threading tool 7 rotational velocities (advance of the tap by forward rotation V2 and retraction of the tap by reverse rotation V3) are overlapped with the rotational velocity V1 of the spindle 2 as shown in FIG. 2. Sequence D ends at step 141.

As is evident from FIG. 2, the present embodiment exercises control by causing the rotational velocity of the threading tool 7 to synchronize with that of the spindle 2 and the positioning pattern of the threading tool 7 created by the positioning pattern creating section 52 to overlap the rotational velocity of the spindle 2. When a threading process is done subsequent to the termination of a cutting process, therefore, the present embodiment allows a transition to be made to the threading process with the spindle 2 kept rotated at high speed, for example, 10,000 rpm, without stopping the spindle 2 as in the conventional approach. Hence, the spindle deceleration time TD1 required in FIG. 6 to bring the spindle 2 rotating at high speed to a stop and the spindle acceleration time TA1 required to speed up the spindle 2 from a stop to high speed are not needed in the present invention. When the cutting process and threading process are repeated alternately for the workpiece 1, the tact time of the machining processes can be decremented by loss time which is equivalent to a sum of the spindle deceleration time TD1 and acceleration time TA1.

In addition to a reduction in the tact time of the machining processes as described above, the present embodiment enhances the functions of a machine tool by merely modifying a conventional control apparatus, because the spindle rotation value detecting section 53, the synchronization checking section 54, and the positioning pattern creating section 52 for creating the positioning pattern necessary for thread cutting are the integral parts of the drive controller 50A, along with the position controller 51 for drive-controlling the drive motor 8 of the threading tool 7 in synchronization with the spindle 2.

It will be recognized that the threading process start command S1 entered from the outside to the programmable controller 20A in the disclosed embodiment in order to output both the synchronization start command S2 for synchronizing the threading tool 7 with the spindle 2 and the threading tool movement start command S7 need not be input from the outside but may be given in the sequence program written for the programmable controller 20A to output commands S2 and S7.

We claim:

1. A control apparatus for a machine tool including threading means for threading a workpiece held by a spindle rotating at a spindle velocity, comprising:
    spindle rotation detecting means for detecting at least one of the rotational velocity and rotational position of said spindle and outputting a rotational value signal;
    positioning pattern creating means for creating a positioning pattern for said threading means in accordance with pre-entered parameters defining the advance and retraction velocities and threading depth of said threading means; and
    threading controlling means responsive to said rotational value signal for operating said threading means for threading said workpiece by synchronizing said threading means with said spindle according to said positioning pattern created by said positioning pattern creating means.

2. A control apparatus for a machine tool as set forth in claim 1 wherein said spindle rotation detecting means is operative to detect both rotational velocity and rotational position of said spindle.

3. A control apparatus for a machine tool as set forth in claim 1 wherein said threading controlling means is operative to synchronize said threading means with the rotational velocity and rotational position of said spindle, overlapping the rotation of the threading means with that of the spindle according to said positioning pattern.

4. A control apparatus for a machine tool as set forth in claim 1 wherein said threading controlling means is operative to advance said threading means following achieving synchronization between said threading means and said spindle.

5. A control apparatus for a machine tool as set forth in claim 1 further comprising feedback means for providing control of at least one of said threading means and said spindle.

6. A control method for a machine tool including a threading means for threading a workpiece held by a rotatable spindle subsequent to a machining process, other than a threading process, comprising the steps of:
    detecting at least one of the rotational velocity and rotational position of said spindle; and
    threading said workpiece by rotating said threading means in synchronization with said at least one of the rotational velocity and rotational position of said spindle,
    the control method further comprising the steps of:
    pre-entering parameters defining the advance and retraction velocities and threading depth of said threading means;
    creating a positioning pattern for said threading means according to said parameters;
    overlapping the rotation of the threading means with that of the spindle according to said positioning pattern; and
    advancing said threading means.

7. The control method according to claim 6 wherein said threading operation is performed in synchronization with said rotational velocity and said rotational position of said spindle.

* * * * *